Nov. 26, 1957  D. D. HOAGG  2,814,211
STEERING WHEEL

Filed June 14, 1954  2 Sheets-Sheet 1

INVENTOR
Donald D. Hoagg
BY
L. D. Burel

Nov. 26, 1957  D. D. HOAGG  2,814,211
STEERING WHEEL

Filed June 14, 1954  2 Sheets-Sheet 2

INVENTOR
Donald D. Hoagg
BY L. D. Burch

United States Patent Office

2,814,211
Patented Nov. 26, 1957

2,814,211

STEERING WHEEL

Donald D. Hoagg, Birmingham, Mich., assignor to General Motors Corporation, Detroit, Mich., a corporation of Delaware Application June 14, 1954, Serial No. 436,395

3 Claims. (Cl. 74—552)

This invention relates generally to steering wheels for automotive and other uses.

A steering wheel for use with automotive vehicles is required to be sturdy in construction while remaining as pleasing in appearance as is possible. A steering wheel must be easy to grip and must not slip within an operator's hands. The gripping surface of a steering wheel must not however be rough and unpleasing to the touch. Heretofore steering wheels have been made in numerous complicated manners including the emersion of the wheel into a plastic dip to cover the wheel with a durable coating. Such steering wheels in themselves have not been overly pleasing in appearance causing many manufacturers to add ornamental horn rings and the like and vehicle operators to cover the wheels for these and various other reasons.

It is now proposed to provide a steering wheel which is both sturdy in construction and pleasing in appearance. The proposed steering wheel is simple and inexpensive to manufacture. It is proposed to provide a flat annular blank upon which half round annular members made of plastic or other material may be secured to provide a cross sectional curvature which will fit easily in the hand of an operator. The half round annular members may be covered with a durable material such as pigskin or the like which is both pleasing to the touch and rich in appearance. The material covering the half round annular members will also remove the chill from the steering wheel which is frequently experienced after a vehicle has been left standing for some time; the cover material warming more readily when grasped by the operator's hands. The flat annular member is scalloped or knurled about its inner and outer peripheries and extends beyond the sides of the half round members secured thereto. The scalloped edges enable the operator to grasp the wheel more firmly without fear of slipping and losing his grasp. The flat annular member and particularly the scalloped edges may be chrome plated to provide a more aesthetic appearance.

Figure 1:
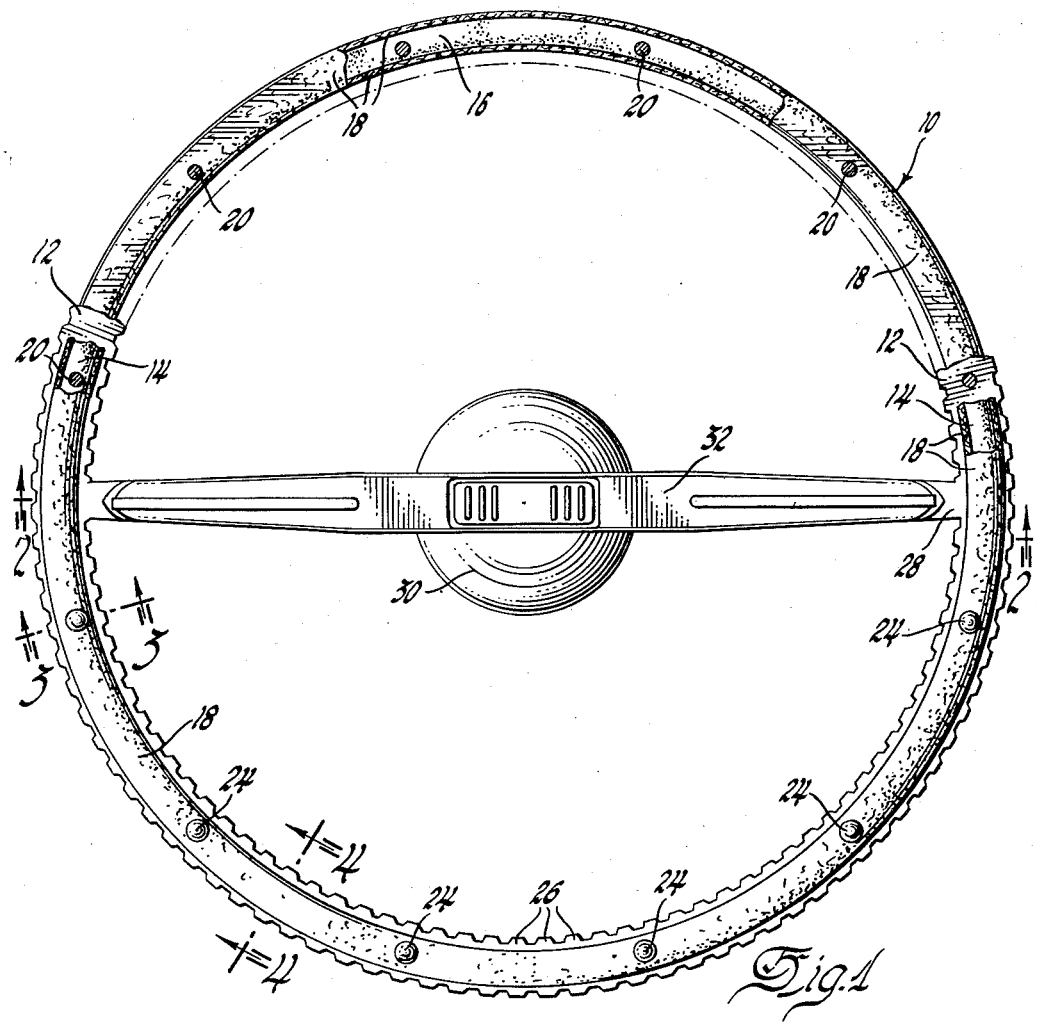
Figure 1 is a plan view of the proposed steering wheel having portions broken away and shown in cross section for greater clarification of details.
Figure 2:
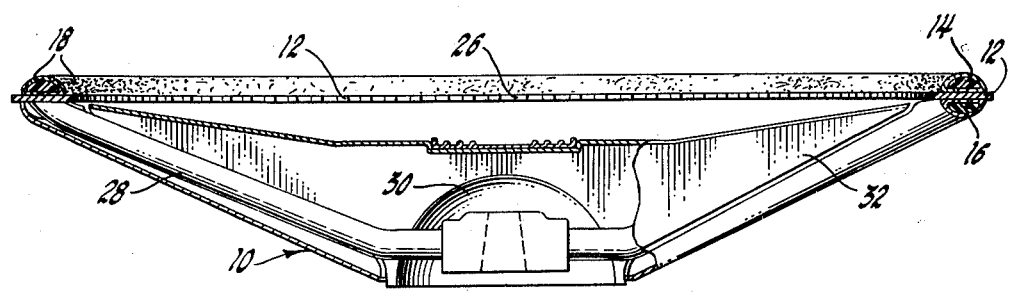
Figure 2 is a view of the proposed steering wheel shown in Figure 1 and taken substantially in the plane of line 2—2 thereon and viewed in the direction of the arrows.
Figure 3:
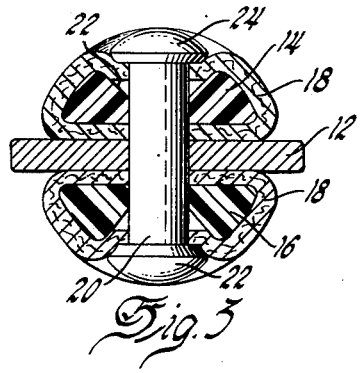
Figure 3 is an enlarged cross sectional view taken in the plane of line 3—3 of Figure 1 looking in the direction of the arrows thereon.
Figure 4:
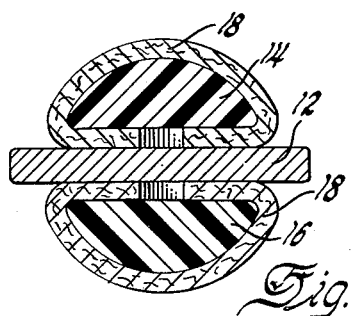
Figure 4 is an enlarged cross sectional view of the steering wheel at Figure 1 taken in the plane of line 4—4 and viewed in the direction of the arrows thereon.
Figure 5:
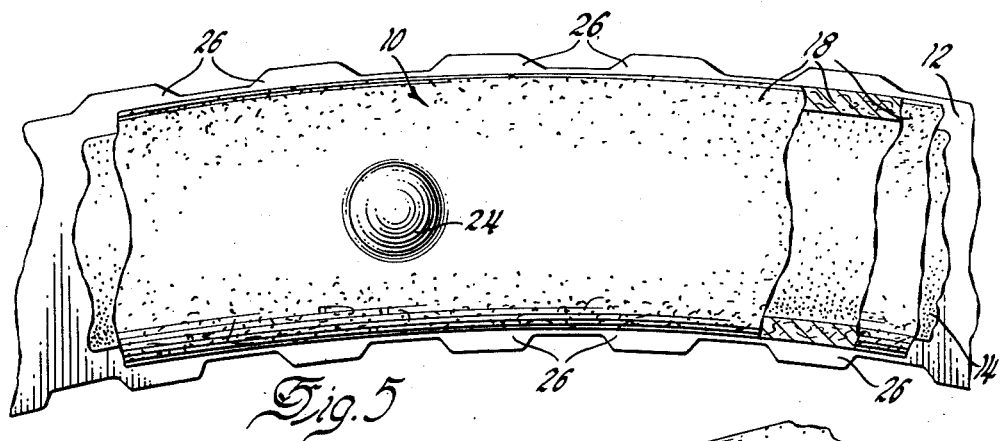
Figure 5 is an enlarged plan view of a portion of the steering wheel having parts broken away and shown in cross section.
Figure 6:
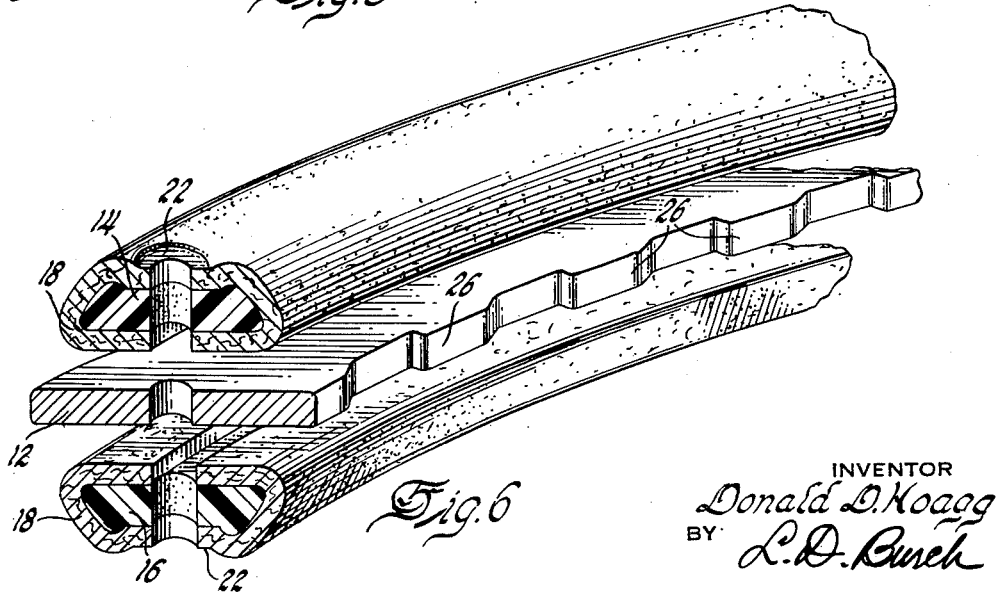
Figure 6 is a prospective view showing parts of the steering wheel as assembled.

The proposed steering wheel 10 includes a flat annular member 12 which is adapted to have half round annular members 14 and 16 of plastic or other material secured to each side thereof. The half round annular members 14 and 16 may be wrapped with a cover material 18 such as pigskin or the like having a rough texture while still remaining soft and pleasing to the touch. The cover material 18 is wrapped around the half round annular members with the edges thereof extended between the flat annular member 12 and the half round annular member 14 or 16 secured thereto. The half round annular members 14 and 16 and the cover material 18 are secured to the flat annular member 12 in the present instance by rivets 20 which are spaced about the wheel and extend through the cover material and annular members 12, 14 and 16. The half round annular members 14 and 16 are countersunk as at 22 in the area of the rivets 20 to enable the rivet head 24 to lie within the face thereof and to form a generally contiguous surface with the cover material 18. The edges of the cover material 18 disposed between the half round and flat annular members 12 and 14 or 16 will retain the cover material upon the annular members 14 and 16 and the rivets 20 as pulled down into the countersunk portion 22 of the annular members will assist in stretching the material more tightly.

The peripheral edges of the flat annular member 12 are scalloped or knurled as at 26 and extend beyond the edges of the half round members 14 and 16 and their covering 18. The scalloped edges 26 of the flat annular member 12 enable the person operating the steering wheel to grasp the wheel more firmly. Such knurled portions 26 when chrome plated also enhance the appearance of the steering wheel.

The steering wheel 10 may be secured to a steering column by means of a depending cross member 28 secured diametrically across the steering wheel. The steering wheel 10 is provided with a portion 30 centrally disposed and adapted to cover the end of the steering column. A hollow cross member 32 integral with the portion 30 is adapted to receive the extended arms of the cross member 28 therein covering the same and again enhancing the appearance of the steering wheel.

I claim:

1. A steering wheel for automotive and other uses which includes an annular member having a cross bar for securement to a steering column, half round annular members secured to each side of said first annular member, a cover material disposed about said half round members and having the edges thereof engaged thereunder and against said first-mentioned annular member, said first annular member having its peripheral edges scalloped and exposed beyond said half round annular members to provide for greater ease in grasping said wheel.

2. A steering wheel which includes a flat annular member having half round annular members secured to opposite sides thereof, a cover material disposed over said half round members and having the edges thereof engaged between said flat and said half round members, said flat member being scalloped about its inner and outer peripheral edges and extending beyond said half round members to provide greater ease in grasping said wheel.

3. A steering wheel adaptable for use with automotive vehicles and which includes a flat annular member having a cross bar for securement to a steering column, half round annular members secured to opposite sides of said flat annular member, a cover material disposed about said half round members and having the edges thereof extended between said half round and flat annular members, and means extending through said material and said members at spaced intervals therearound for retaining said members together, said flat annular member having its inner and outer peripheral edges extended outwardly beyond the edges of said half round members and scalloped for greater ease in grasping said wheel.

References Cited in the file of this patent

UNITED STATES PATENTS

| | | |
|---|---|---|
| 1,190,781 | Maher | July 11, 1916 |
| 1,822,516 | Cobb | Sept. 8, 1931 |
| 1,828,403 | Geyer | Oct. 20, 1931 |
| 2,631,204 | Kibiger | Mar. 10, 1953 |

FOREIGN PATENTS

| | | |
|---|---|---|
| 23,175 | Great Britain | Apr. 22, 1915 |
| 34,740 | France | Apr. 16, 1929 |
| | (Addition to No. 601,693) | |
| 593,734 | France | June 6, 1925 |